(12) United States Patent
Meinecke et al.

(10) Patent No.: US 10,788,844 B2
(45) Date of Patent: Sep. 29, 2020

(54) METHOD AND SYSTEM FOR AUTOMATIC CONTROL OF AT LEAST ONE FOLLOWING VEHICLE BY A SCOUT VEHICLE

(71) Applicant: VOLKSWAGEN AKTIENGESELLSCHAFT, Wolfsburg (DE)

(72) Inventors: Marc-Michael Meinecke, Sassenburg (DE); Arne Bartels, Wolfsburg (DE); Lutz Junge, San Mateo, CA (US); Michael Darms, Lehre (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 368 days.

(21) Appl. No.: 15/739,191

(22) PCT Filed: Jul. 5, 2016

(86) PCT No.: PCT/EP2016/065752
§ 371 (c)(1),
(2) Date: Dec. 22, 2017

(87) PCT Pub. No.: WO2017/012851
PCT Pub. Date: Jan. 26, 2017

(65) Prior Publication Data
US 2020/0033886 A1 Jan. 30, 2020

(30) Foreign Application Priority Data
Jul. 21, 2015 (DE) .................. 10 2015 213 743

(51) Int. Cl.
*G05D 1/02* (2020.01)
*B60W 30/09* (2012.01)

(52) U.S. Cl.
CPC ........... *G05D 1/0295* (2013.01); *B60W 30/09* (2013.01); *G05D 1/0246* (2013.01)

(58) Field of Classification Search
CPC .. G05D 1/0295; G08G 1/096725; G08G 1/22; G08G 1/096791; B60W 2420/42; B60W 2050/0077; B60W 2556/65
See application file for complete search history.

(56) References Cited

U.S. PATENT DOCUMENTS

| 2008/0059007 | A1 | 3/2008 | Whittaker et al. |
| 2015/0032369 | A1* | 1/2015 | Schmidt ........... G08G 1/096791 701/467 |
| 2017/0309187 | A1* | 10/2017 | Lin .......................... G08G 1/22 |

FOREIGN PATENT DOCUMENTS

| DE | 19949448 A1 | 5/2001 |
| DE | 102005059517 A1 | 6/2007 |

(Continued)

OTHER PUBLICATIONS

Search Report for German Patent Application No. 10 2015 213 743.0, dated Mar. 31, 2016.

(Continued)

*Primary Examiner* — Michael J Zanelli
(74) *Attorney, Agent, or Firm* — Barnes & Thornburg LLP (57) ABSTRACT

A method for automatic control of at least one following vehicle wherein a scout trajectory is generated for a scout vehicle, which is guided along an actual trajectory, wherein the actual trajectory of the scout vehicle and environmental data of the scout vehicle are detected by sensors of the scout vehicle. A target trajectory is generated for the following vehicle and environmental data of the following vehicle are detected by sensors of the following vehicle. The scout trajectory and environmental data of the scout vehicle are transferred to the following vehicle and, if the detected (Continued)

actual trajectory and the generated target trajectory each have at least a certain trajectory similarity to the generated scout trajectory and if the environmental data of the following vehicle have at least a certain environmental data similarity to the environmental data of the scout vehicle, an automatic control of the following vehicle is activated.

15 Claims, 3 Drawing Sheets

(56) References Cited

FOREIGN PATENT DOCUMENTS

| DE | 102007036248 A1 | 2/2009 |
|---|---|---|
| DE | 102009050503 A1 | 11/2010 |
| DE | 102010013647 A1 | 2/2011 |
| DE | 102010007240 A1 | 8/2011 |
| DE | 102012009238 A1 | 11/2012 |
| DE | 102011080922 A1 | 2/2013 |
| DE | 102012004650 A1 | 9/2013 |
| DE | 102012208256 A1 | 11/2013 |
| DE | 102013006687 A1 | 10/2014 |
| DE | 102013212255 A1 | 12/2014 |
| DE | 102013225011 A1 | 6/2015 |

OTHER PUBLICATIONS

Search Report for International Patent Application No. PCT/EP2016/065752, dated Sep. 14, 2016.

* cited by examiner

METHOD AND SYSTEM FOR AUTOMATIC CONTROL OF AT LEAST ONE FOLLOWING VEHICLE BY A SCOUT VEHICLE

PRIORITY CLAIM

This patent application is a U.S. National Phase of International Patent Application No. PCT/EP2016/065752, filed 5 Jul. 2016, which claims priority to German Patent Application No. 10 2015 213 743.0, filed 21 Jul. 2015, the disclosures of which are incorporated herein by reference in their entireties.

SUMMARY

Illustrative embodiments relate to a method for automatic control of at least one following vehicle. Illustrative embodiments further relate to a system for automatic control of at least one following vehicle by a scout vehicle.

BRIEF DESCRIPTION OF THE DRAWINGS

The disclosed embodiments are now explained with reference to the drawings.

DETAILED DESCRIPTION

To increase efficiency and safety in transport and logistics, particularly in connection with the transport of goods, but also in passenger transport, the extensive automation of vehicles is a desirable goal. Techniques are already known, which by automatic intervention in the control of a vehicle at different levels, relieve the load on the driver or carry out individual driving maneuvers automatically. This ranges from remote control through to the autonomous driving of a route by a vehicle.

DE 10 2005 059 517 A1 describes such a system for driving and operating a driverless vehicle, wherein data from sensors of the vehicle are forwarded to an operations center and the operations center transfers operational data to the vehicle for controlling the vehicle. In this case, data transfer between the vehicle and the operations center is required to take place in near real time, or else any time delay that occurs is compensated by technical methods.

In the method described in DE 10 2013 212 255 A1, a first vehicle examines a space relative to the first vehicle using a sensor system and transmits the result of the examination to a second vehicle. This allows the latter to be informed, for example, whether an area in the environment of the first vehicle is free and whether a merging maneuver can be carried out.

In the method described in DE 10 2013 225 011 A1, in a motor vehicle driving by highly automatic modes, the vehicle's own position is matched with external data about a current traffic situation and a decision is made as to whether a change in the driving state is required. It is detected whether the vehicle is approaching an obstacle or a section of the route which is not automatically navigable for other reasons. This can lead to the termination of the automated driving. For example, the section of the route in front of the vehicle can be disabled for automated driving, or a traffic congestion alert can be used for the timely termination of highly automatic driving.

A key prerequisite for the safe operation of these systems is, however, a high degree of redundancy in the security measures used. Typically, the automatic execution of a driving maneuver assumes the presence of a driver, who monitors the movement of the vehicle and can take corrective action. This protects against malfunctions of the system, due to events such as defective sensors or unusual traffic situations.

If the system is to be operated without a driver being provided for every vehicle, high-grade redundancies will need to be provided at a technical level. This is achieved, for instance, by the installation of a plurality of sensors—in some cases implemented multiple times—in the vehicle. In this case, however, the options for integration of sensors in a vehicle are also physically limited, and also incur considerable additional costs.

Disclosed embodiments provide a method and a system for automatic control of at least one following vehicle, in which method and system a highly automated control is secured through redundancy.

In the disclosed method, a scout trajectory is generated for a scout vehicle. The scout vehicle is guided along an actual trajectory, wherein the actual trajectory of the scout vehicle and scout environmental data are recorded using sensors of the scout vehicle. A target trajectory is generated for the following vehicle, and following vehicle environmental data are recorded by sensors of the following vehicle. The actual trajectory is then transferred to the following vehicle. If the recorded actual trajectory and the target trajectory of the vehicle both have at least a specified trajectory similarity and/or if the following vehicle environment data have at least a specified environmental data similarity to the scout environmental data, then an automatic control of the vehicle is activated along the target trajectory.

The route to be traveled is therefore examined for its suitability for driving in several stages. By using the combination of a scout vehicle which decides on the automatic navigability of a trajectory, and a following vehicle which examines the data of the scout vehicle at the time the trajectory is navigated, a high degree of redundancy, and thus a high degree of safety, is obtained. It is examined whether the target trajectory that is to be driven automatically by the following vehicle is evaluated by the scout vehicle as being navigable and it is continuously examined whether the conditions on the route have changed since the evaluation by the scout vehicle.

A "trajectory" in this document is used to designate a motion path, along which one of the vehicles involved can drive. The can also be understood to include motion paths that are both actually driven and planned. The trajectory can be as long or as short as desired, for example, it may comprise a section of the route on a road, or a longer route between two geographical positions.

In the first operation a route, for example, a public road, a path within a closed area of land or in a building, is driven by a scout vehicle. A scout trajectory is first generated, for example, from a route planner or a navigation system of the scout vehicle. The scout trajectory corresponds to a calculated motion path of the vehicle. The vehicle is guided along an actual trajectory, which need not necessarily correspond exactly to the theoretical scout trajectory. For example, this may be due to the fact that the vehicle must avoid obstacles such as other vehicles, or that the actual conditions of the route do not exactly correspond to the cartographic starting data used for planning the scout trajectory. A manual vehicle guidance can take place, for example, by a driver or by remote control.

The actual trajectory along which the scout vehicle is actually moving is recorded, wherein methods such as satellite-based systems, but also other known methods, can be used for position and route determination. The actual trajectory is recorded in such a way that a comparison can be carried out against the scout trajectory. During this comparison a trajectory similarity is determined, by which the degree of similarity is quantitatively specified. It is thus possible to examine the extent to which the actual trajectory which is currently being driven matches the automatically calculated scout trajectory, i.e., whether an automatic control based on the generated scout trajectory would have led to a navigable trajectory. This corresponds to an autopilot of the vehicle in a "passive test mode", which is used for reviewing the decisions taken by the autopilot. The generated scout trajectory must be sufficiently similar to the real actual trajectory to be evaluated as navigable.

The scout vehicle also comprises sensors, by which the scout environmental data are collected. These environmental data characterize the route being traveled, and so they relate to such features as the characteristics of the surface being driven over, for example, the course of the road, road markings or the condition of the road surface, information signs, roadworks, plants and landscape features in the vicinity of the route. The sensors used are known per se and can be combined as required.

After the scout vehicle has driven along the trajectory, the data collected during this journey is used to check whether the following vehicle can also drive along the trajectory. First of all, for instance, using a route planner of the following vehicle, a target trajectory is generated, along which the vehicle is to be automatically controlled. The scout vehicle and the following vehicle comprise similar or functionally identical route planners, which under the same functional conditions calculate at least approximately identical trajectories. However, different route planners can also be used.

In the following vehicle, the target trajectory is compared with the scout trajectory, wherein at least portions of the trajectories are analyzed. A trajectory similarity is generated, which—in a manner analogous to the comparison of the scout trajectory with the actual trajectory—indicates quantitatively the degree of similarity. It is thus possible to determine whether the target trajectory substantially matches the scout trajectory driven by the scout vehicle.

The following vehicle also comprises sensors, in a manner analogous to the scout vehicle, by which the following vehicle environmental data are recorded. These sensors can record essentially the same features of the route and the environment as the sensors of the scout vehicle, except the same sensor types are not necessarily used and the number of sensors can differ. The essential point is that the following vehicle environment data and the scout environment data provide comparable results, for example, when identifying the position of roadworks on the edge of the road.

The scout environmental data and the following vehicle environmental data are compared with each other in the following vehicle and an environmental data similarity is determined. Through an examination of the environmental similarity it can be ensured that the following vehicle is actually located on the same trajectory as the scout vehicle and it can be checked whether and to what extent the characteristics of the route to be traveled have changed since this was driven by the scout vehicle.

For the decision as to whether a trajectory can be safely navigated automatically by the following vehicle, for example, threshold values may be defined for the trajectory similarities and for the environmental data similarity. If the similarities are large enough, the automatic control of the following vehicle is activated for the target trajectory, or the trajectory is enabled for automatic driving.

The following vehicle records, in particular, additional data for the automatic control. This can be performed by additional sensors, or else the same sensors can be used as for the comparison against the scout environmental data. For example, data on moving objects in the vicinity of the following vehicle can be recorded, from which the following vehicle must keep its distance or which it must avoid. These data are not relevant to the comparison with the scout environmental data, since they are not features of the route being traveled, but depend on the individual vehicle and typically change in short timescales. If the scout vehicle is constantly being overtaken, it can be concluded that the overtaking lane can also be used for the automatic driving. In this case, two free trajectories are sent to the following vehicle.

In at least one embodiment of a disclosed method, the scout vehicle is driven manually by a scout driver. This means that a human driver decides on the driving of the scout vehicle. It is assumed that the scout the scout driver drives the vehicle along a trajectory, which in principle is also suitable for the automatic control of the following vehicle. The scout driver may be located in the scout vehicle, however, the scout vehicle can also be driven via remote control, for example, from an operations center, as described in DE 10 2005 059 517 A1.

In the case of a further disclosed embodiment, if the environmental data similarity does not exceed the specified value, a safe driving mode of the following vehicle is activated. This ensures that the following vehicle is driven safely on a trajectory which is unsuitable for the automatic control.

For example, the environmental data similarity can then no longer reach the specified threshold if the route guidance has changed since the scout vehicle recorded the scout environmental data. For example, a construction site or a blockade following an accident can make it necessary to divert to another lane and the alternative route to be no longer assessed as automatically drivable. In the safe driving mode the speed of the vehicle is reduced, if necessary to the extent of stopping the vehicle at a suitable location. Furthermore, a driver of the n-th following vehicle can be notified and assume manual control of the following vehicle, in which case the driver can be located in the following vehicle, or the following vehicle can be controlled remotely.

The automatic control of the following vehicle may comprise a control of the movement of the following vehicle in the longitudinal and transverse directions. This allows the direction and speed of the following vehicle along a trajectory to be controlled.

The data, by which the target trajectory is assessed as automatically navigable, can be transferred directly from the scout vehicle to the following vehicle. This typically results in a slight temporal delay between the recording of the scout environmental data and the following vehicle environmental data. It is therefore to be expected that only minor changes are made, unless sudden events occur, such as a blockage due to an accident.

In at least one disclosed embodiment, data relating to the scout trajectory and/or data relating to the target trajectory and/or scout environmental data and/or following vehicle environmental data are transferred to an external server and stored by the server. This indirect transfer of data allows the respective data to be managed at a central point and flexibly delivered. It also allows the scout environmental data to be processed on the external server.

In a further configuration, the external server transfers data relating to the scout trajectory and/or scout environmental data to the following vehicle. This allows the data necessary for comparison of the trajectories and environmental data to be made available to the following vehicle at a central location.

The data, with which the target trajectory is evaluated as automatically navigable, can in this case be managed by the server and the following vehicle can then follow the trajectory at a longer temporal interval from the scout vehicle. The storage can take place for a longer or shorter period of time, in which case the characteristics of different scout environmental data can be taken into account. For example, advertising billboards can change their appearance and therefore lose their significance after a certain period of time, while for example, the location of an advertising billboard itself can be characteristic of the environment of the trajectory over the longer term.

By the storage of the environment data recorded by the scout vehicle and the following vehicle on the server, environmental data of a plurality of vehicles can also be saved and merged, for example, at different times. This allows an updating of the scout environment data provided by the server, such as if the appearance of the vegetation on the edge of a route changes, or if new roadworks are set up. In this case, an updating procedure can be provided that automatically detects minor changes and performs a corresponding update, while in the case of major changes the scout environment data of the trajectory must be re-recorded by a manually driven scout vehicle and a re-evaluation of the automatic navigability of the trajectory must be made.

In addition, the scout environment data for a longer route, the whole of which has not been driven by a scout vehicle, can combine the scout environmental data from multiple scout vehicles. For example, the longer route can be divided into a plurality of partial trajectories, for each of which scout environmental data from different scout vehicles are available.

In an extension, the sensors of the scout vehicle and/or the sensors of the following vehicle record image data. This means the sensor data become suitable for interpretation by a human observer, for example, to verify the automatic extraction of features or to review the suitability of the route for automatic driving.

The image data can be recorded in accordance with known methods, for example, by the detection of light in the visible range or by infrared cameras. In addition, image data can be generated on the basis of other detection methods or combined with other data, using such techniques as ultrasound, radar or lidar.

In at least one disclosed embodiment, if the trajectory comparison does not exceed the specified value, following vehicle environmental data are transferred to a decision agent and control data are transferred from the decision agent to the following vehicle. This allows a decision agent, in particular a human decision-maker, to support the operation of the system.

If the required similarity between the scout and following vehicle environment data or trajectories is not found, for example, because changes have been made to construction sites in the vicinity of the trajectory, or because a new speed limit has been introduced for the trajectory, then the automatic control of the following vehicle is not automatically enabled. In addition, differences may occur during the acquisition of the environmental data by sensors and equipment of the scout vehicle and the following vehicle, for example, if one of the systems interprets a traffic sign incorrectly or if characteristics of the vegetation on the edge of the trajectory are interpreted differently. This may be favored by changes in the visibility or weather conditions.

The decision on the automatic navigability of the trajectory can in this case be referred to a decision agent, and to this end, following vehicle environmental data can be transferred to the decision agent. The function of the decision agent is here fulfilled by an entity that can take a decision on the automatic navigability and/or can transmit additional signals for controlling the following vehicle. This can be, for example, a driver of the following vehicle or of the scout vehicle, but also a user in an operations center, to whom the recorded environmental data are displayed and who activates the automatic control of the vehicle or activates a manual control (possibly remote control) of the following vehicle.

In a further disclosed embodiment, the scout environmental data and/or the following vehicle environmental relate to highway construction sites and/or traffic signs. This allows features of the trajectory relevant to traffic regulation and traffic infrastructure to be recorded.

The environmental data can extend beyond the mere external description of the features of the environment of the trajectory to also include their interpretation. For example, on the basis of image data from traffic signs it is possible to determine whether a speed limit, an overtaking ban or a particular right-of-way rule is in place. Even if the signage has changed since the acquisition by the scout vehicle, the validity of a particular traffic regulation can be acquired as an essential feature. The abstraction of the content of a traffic sign from its external structure allows the consideration of dynamic traffic guidance systems, so that perhaps modified states of a traffic light cycle or a variable speed limit do not result in the environmental data similarity not reaching the specific value and automatic driving being assessed as unsafe.

In one extension, priorities are determined for discrepancies between the scout environmental data and the following vehicle environmental data, and environmental data similarity is generated in accordance with the priorities. This ensures that the environmental data similarity is determined on the basis of relevant features of the trajectory.

Different types of discrepancy can be weighted differently. For example, a new lane installation on a highway will be weighted higher than a road marking that is hidden (for example, due to snow), or a tree which has changed its appearance or has been felled since the data acquisition by the scout vehicle. The differentiation between features that are relevant to the safety of an automatic control of the following vehicle and those that are less relevant or only relevant in combination with others, allows a robust operation of the system with respect to small changes.

If the scout vehicle and following vehicle environmental data are transferred to and stored on an external server, then an update of the environmental data can also be made on the basis of the priorities. For example, features with low priority, such as a change in the vegetation at the edge of a route, can be changed on the basis of current data, while for more relevant changes such as the installation of a traffic lane, automatic driving can only be safely activated again when the scout environmental data are re-acquired.

In at least one disclosed embodiment, scout vehicle data about the properties of the scout vehicle are additionally transmitted to the following vehicle, and the automatic control of the vehicle is also result activated in accordance with the scout vehicle data. This means it is possible to assess in a convenient manner, whether the scout environmental data collected by the scout vehicle are relevant to the following vehicle.

For example, a height restriction, which is relevant for a scout vehicle, may not relevant for a following vehicle of a different type. In addition, for example, different traffic regulations such as speed restrictions or overtaking bans may only apply to certain types of vehicle.

In the disclosed system for automatic control of at least one following vehicle, a scout vehicle comprises a scout route planner, by which a scout trajectory can be generated for the scout vehicle, a scout control device, by which the scout vehicle can be driven along an actual trajectory, and sensors, by which the actual trajectory and the scout environment data can be acquired. The following vehicle comprises a following vehicle route planner, by which a target trajectory can be generated for the following vehicle, sensors, by which following vehicle environmental data are recorded, and a following vehicle control device, by which the vehicle can be guided along the trajectory. On the basis of the acquired actual trajectory and the generated target trajectory, at least one trajectory similarity relating to the generated scout trajectory can be determined. The scout trajectory and scout environmental data can be transferred to the following vehicle and on the basis of the following vehicle environmental data and the scout environmental data, an environment data similarity can be determined. Finally, an automatic control of the following vehicle along the target trajectory can be activated in accordance with the environmental data similarity.

The disclosed system is designed to implement the above-described method. The system therefore has the same benefits as the disclosed method.

In an extension, following vehicle environmental data can also be transferred to the scout vehicle and control data can be transferred from the scout vehicle to the following vehicle. This allows following vehicle environmental data to be output to the driver of the scout vehicle, who can then intervene in the control of the following vehicle.

Such an intervention can be effected if safe automatic driving of the following vehicle is not possible. The intervention can also consist of enabling the automatic control of the following vehicle, for example, if the driver of the scout vehicle assesses the trajectory being traveled as safe for driving.

In a further disclosed embodiment the system also comprises an external server, which for at least part of the time is connected to the scout vehicle and/or to the following vehicle for data communication. The external server enables data relating to the scout trajectory and/or scout environmental data and/or following vehicle environmental data to be stored. This means that the data exchange is independent of a direct connection between scout vehicle and following vehicle.

In one configuration, the scout trajectory and the target trajectory are generated by the scout route planner and the following vehicle route planner in such a way that they are essentially identical. This increases the comparability of the trajectories determined by the driving planners.

Figure 1:
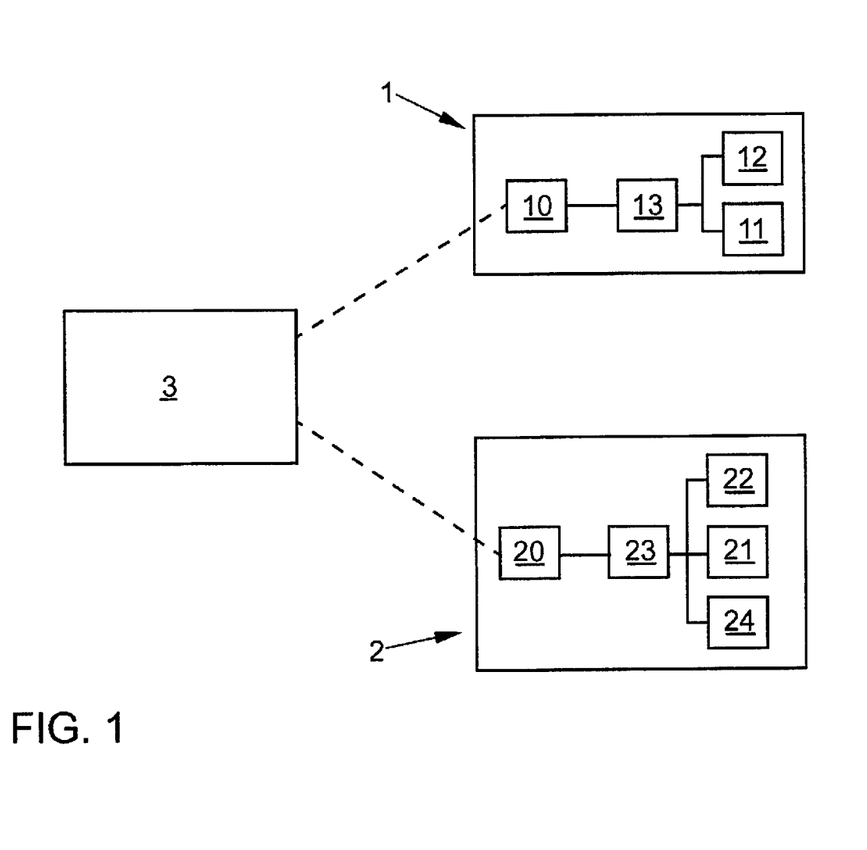
FIG. 1 shows an exemplary embodiment of the disclosed system.

With reference to FIG. 1 an exemplary embodiment of the disclosed system will be described.

The system comprises a scout vehicle 1, a following vehicle 2 and an external server 3. The scout vehicle 1 and the following vehicle 2 are, at least for part of the time, connected to the external server 3 for data communication. To this end the system comprises data interfaces 10 and 20 of the scout vehicle 1 and the following vehicle 2. In this way, data can be transferred from the vehicles to the external server 3, where it is stored and transferred from the external server 3 to the vehicles. This enables an indirect exchange of data between the scout vehicle 1 and the following vehicle 2, without the need for a direct connection between the two.

The data communication connection can be effected wirelessly, for example, by a local area network or a larger network, such as the internet. It is also possible to establish the connection via a telecommunications network, for example, a telephone network, or a wireless local area network (WLAN). The connection can also be established indirectly via another unit, which can establish a connection to the external server itself. For example, a data communication connection can exist between the mobile unit and an internet-connected mobile phone, for example, by a data cable or a wireless link, for instance, via BLUETOOTH®. The connection to the external server 3 can be established via the internet.

In a further exemplary embodiment, the scout vehicle 1 and the following vehicle 2 are alternatively, or in addition to the external server 3, connected to each other. In this case, the system does not necessarily comprise the external server 3. In this case, the data exchange can be carried out directly between vehicles.

The scout vehicle 1 comprises a control unit 13, to which the data interface 10, a route planner 12 and an acquisition unit 11 are linked. The route planner 12 of the scout vehicle 1 generates a scout trajectory. In addition, the acquisition unit 11 records the scout environmental data and the actual trajectory traveled by the scout vehicle 1.

The actual trajectory is determined in accordance with known methods, in particular on the basis of the data from a satellite-based location system. In addition, other sensors of the acquisition unit 11 capture image data in the environment of the scout vehicle 1, wherein in addition to sensors for the visible part of the light spectrum, infrared cameras are also used. In addition, radar and lidar sensors are used. The environmental data comprise characteristic features in the environment of the route traveled, such features as the characteristics of the surface being driven over, for example, the course of the road, road markings or the condition of the road surface, information signs, roadworks, plants and landscape features in the vicinity of the route.

Analogously to the scout vehicle 1, the following vehicle 2 also comprises a control unit 23, which is linked to the data interface 20, a route planner 22 and a recording unit 21. It also comprises an autopilot 24, which can control the vehicle automatically. By the acquisition unit 21, following vehicle environmental data is collected.

The automatic control by the autopilot 24 is carried out according to known methods, in particular by automatic interventions in the longitudinal and transverse acceleration of the following vehicle 2. In this way, the direction and magnitude of the vehicle speed can be controlled. The autopilot assumes a target trajectory defined by the route planner 22 of the following vehicle 2, however, the trajectory actually driven by the following vehicle 2 may differ from the target trajectory, for example, if obstacles must be compensated for or if the flow of traffic requires a deviation from the planned trajectory. The automatic control by the autopilot 24 presupposes that the automatic control has been activated by the control unit 23.

Figure 2:
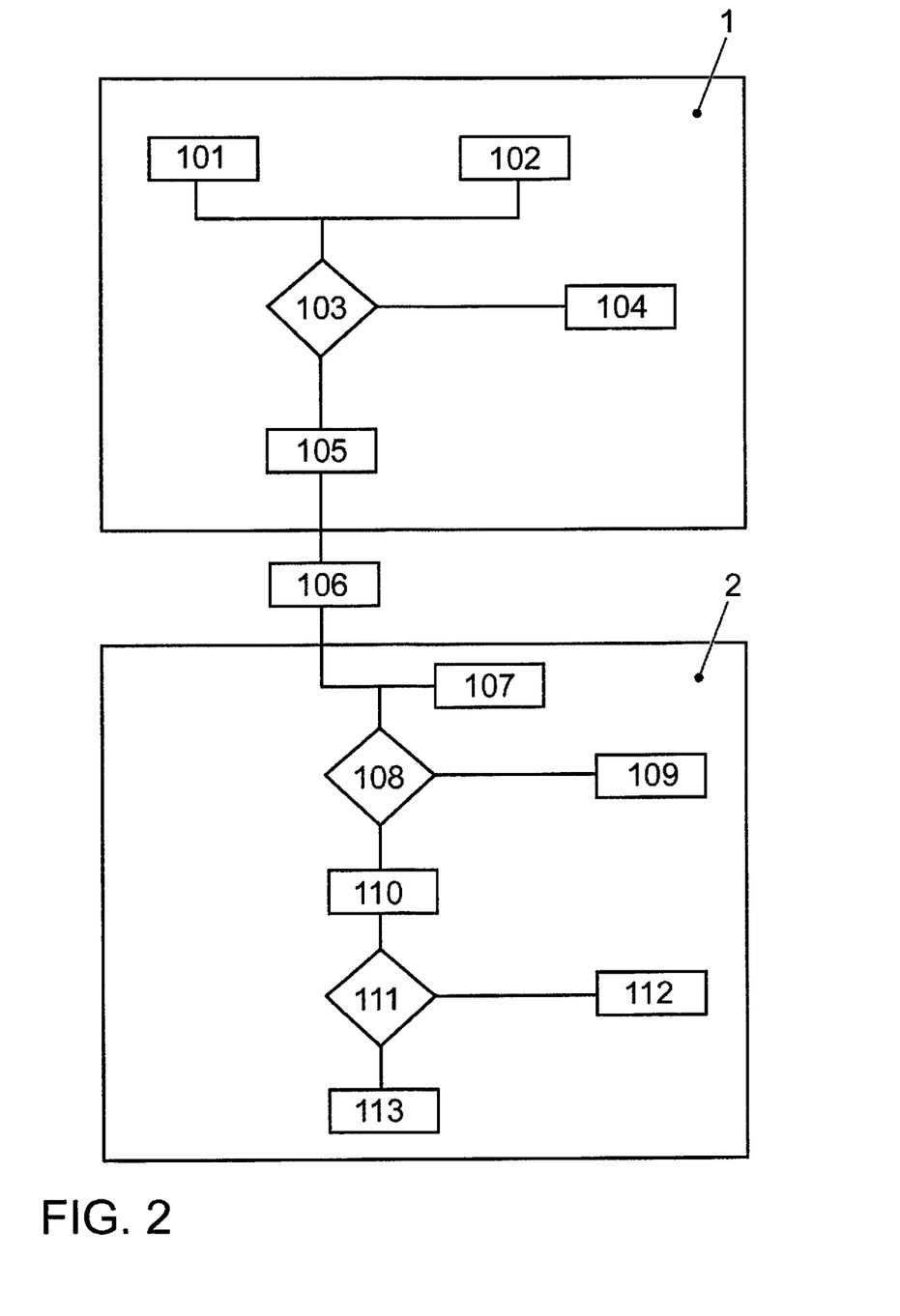
FIG. 2 shows an exemplary embodiment of the disclosed method.

With reference to FIGS. 1 and 2, an exemplary embodiment of the disclosed method will be described.

In this example, the disclosed method is implemented by the system shown in FIG. 1. The representation of the operations, by which the disclosed method is described, does not necessarily reflect the sequence of implementation of individual operations. These can also be executed with a larger or smaller time interval or at the same time.

The scout vehicle 1 is driven on an actual trajectory. In the case illustrated, it is controlled by a driver, who manually controls the steering and the speed of the vehicle. In the scout vehicle 1, in an operation at 101 a scout trajectory is determined by the route planner 12, and in an operation at 102 the actual trajectory is additionally acquired by the detection unit 11.

In operation at 103, scout and actual trajectory are compared with one another. From this, a trajectory similarity is determined. If in the process a defined threshold is undershot, then in an operation at 104 the automatically planned trajectory is assessed as unsafe to be driven automatically, since the driver of the scout vehicle 1 has not chosen the automatically generated scout trajectory. If, on the other hand, the threshold value is reached or exceeded, then the automatically generated trajectory is assessed as automatically safe to drive, since the automatic route planner 12 and the driver of the scout vehicle 1 have chosen the same trajectory.

In an operation at 105, scout environmental data are recorded. The scout environmental data can be recorded on a continuous basis, regardless of the trajectory similarity between the scout and actual trajectories determined in operation at 103.

In operation at 106, the scout trajectory and scout environmental data are transferred to the following vehicle 2. Only relevant data are transferred, such as scout environmental data that have been determined as being characteristic of the course of the scout trajectory, or those parts of the scout trajectory, as were detected as being relevant to the following vehicle 2. This may involve a bi-directional connection between scout vehicle 1 and following vehicle 2 for the exchange of information about the data to be transferred.

The transfer here is carried out indirectly via the external server 3, as shown in FIG. 1. In a further exemplary embodiment a direct connection exists between the scout vehicle 1 and the following vehicle 2.

In an operation at 107, the route planner 21 of the following vehicle 2 generates a target trajectory for the following vehicle 2. In a further operation at 108, the target trajectory the scout trajectory are compared and a trajectory similarity is determined. In a similar way to the comparison of the actual and scout trajectories in operation at 103, it is determined whether the planned trajectory for the following vehicle 2 substantially corresponds to the scout trajectory. Together with the similarity between the scout trajectory and the actual trajectory traveled by the scout vehicle 1, the information is derived as to whether the following vehicle 2 is located on essentially the same trajectory as the scout vehicle 1 previously.

If this is not the case, the method is aborted in operation at 109, since the scout vehicle 1 and the following vehicle 2 are on different trajectories. If, on the other hand, a specified threshold value of the trajectory similarity is reached, then in operation at 110 following vehicle environmental data is collected. This is effected analogously to the acquisition of the scout environment data by the scout vehicle 1 in operation at 105.

In operation at 111, the scout environmental data that have been transferred to the following vehicle 2 in operation at 106, are compared with the recorded following vehicle environmental data. For the environmental data similarity a threshold value is defined, which if it is undershot, the target trajectory is evaluated in an operation at 112 as being unsafe to be automatically driven. This means that characteristic features of the target trajectory differ from the features of the scout trajectory, and that therefore changes have taken place since the route was driven by the scout vehicle 1. It is therefore assumed that features of the trajectory that are relevant to the safety of automatic driving have changed and the evaluation of the trajectory by the scout vehicle 1 is out of date.

In this case a safe driving mode of the following vehicle 2 is activated, in which alternatively or in addition to the autopilot 24, a driver monitors the guidance of the vehicle 2 or actively intervenes. In the case illustrated, this is executed by a driver in the following vehicle 2, in other exemplary embodiments however, the driver can be located, for example, in the scout vehicle 1 or can send control signals to the following vehicle 2 from an operations center via the external server 3.

If, however, the environmental data similarity reaches a specified threshold value, this will result in operation at 113 in the automatic control of the following vehicle 2 along the target trajectory being activated. In this case, the autopilot 24 of the following vehicle 2 assumes control of the following vehicle 2 in the longitudinal and transverse directions. This is effected on the basis of data acquired by the acquisition unit 21, such as information about positions and the movement of other road users, the course of the highway, obstacles on the highway and traffic regulations, such as speed restrictions or overtaking bans.

Figure 3A:
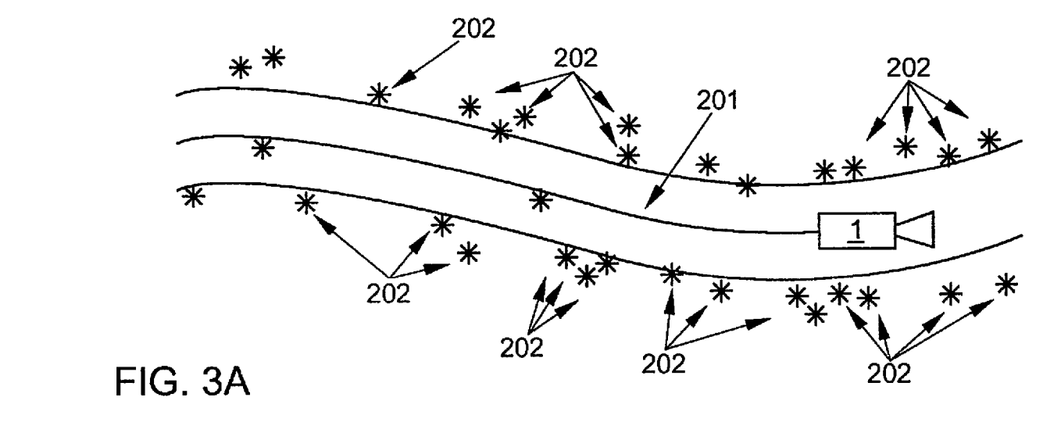
FIG. 3A shows another exemplary embodiment of the disclosed method.
Figure 3B:
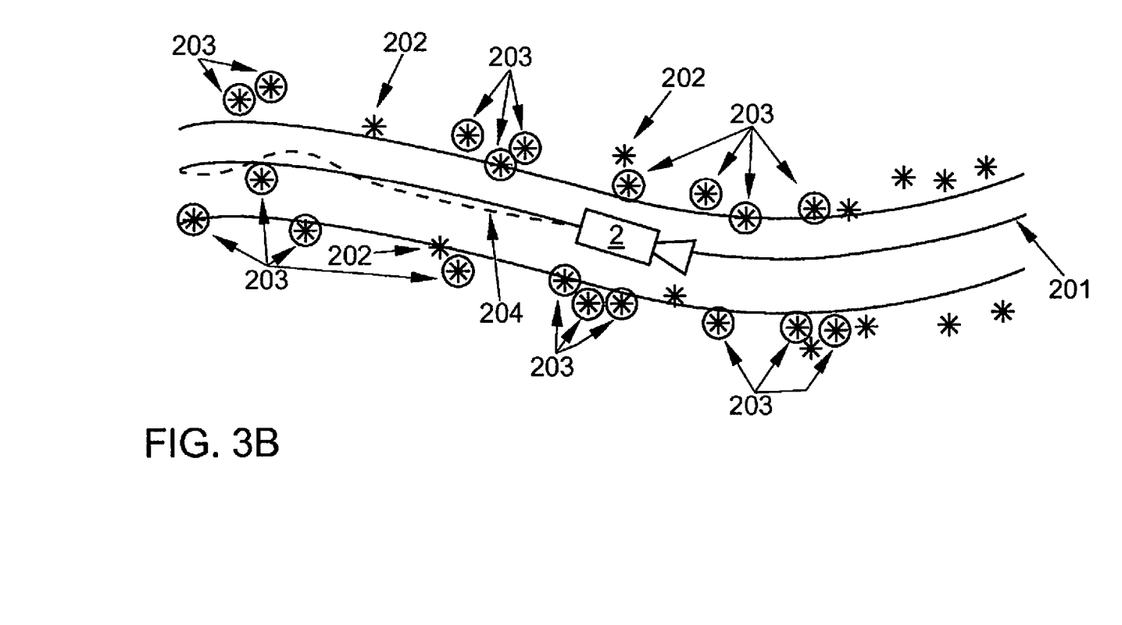
FIG. 3B shows another exemplary embodiment of the disclosed method.

On the basis of FIGS. 3A and 3B, another exemplary embodiment of the disclosed method will be explained. In this example, the disclosed method is implemented by the system shown in FIG. 1.

First of all, the scout vehicle 1 is driving a route along the actual trajectory 201. At the same time, the sensors of the acquisition unit 11 of the scout vehicle 1 record scout environmental data, which comprise scout orientation points. In the case illustrated, these are traffic signs on the road and on the hard shoulder, and buildings and landscape features, such as individual trees, in the environment of the actual trajectory 201.

At the same time, the actual trajectory 201 is compared with a scout trajectory (not shown) determined by the route planner 12 of the scout vehicle 1 and a high trajectory similarity is found. This means that the driver, who in the example shown is driving the scout vehicle 1, selects essentially the same trajectory as the route planner 12 would automatically. Therefore, the automatically generated scout trajectory is evaluated as being safe for driving.

At a later time, the following vehicle 2 drives the same route. The route planner 22 of the following vehicle 2 generates a target trajectory 204 and the actual trajectory is transferred to the following vehicle and compared with the target trajectory 204. In the case illustrated the trajectory similarity is large enough that essentially the same trajectories can be assumed.

In addition, the scout environmental data are transferred to the following vehicle 2. At the same time, the following vehicle 2 records its own following vehicle environmental data and compares them with the scout environmental data. Some of the scout orientation points 202 are found to match the following vehicle orientation points 203 recorded by the following vehicle 2. For example, trees or traffic signs are detected in the same positions.

In a comparison, an environmental data similarity is determined, which in the case illustrated exceeds a predefined threshold. Therefore, the automatic control based on the autopilot 24 is activated for the following vehicle 2 along the target trajectory 204.

In the comparison a prioritization of the various features is performed. For example, it has less serious consequences for the environmental data similarity, if a part of the vegetation at the edge of the route has changed, than if the course of a lane has been changed. In addition, vehicle data of the scout vehicle 1 are taken into account, such as its height, which need not be identical to the height of the following vehicle 2.

In a further exemplary embodiment, scout trajectories and associated scout environmental data are saved and transferred to a following vehicle 2 by the external server 3. As a result of this central storage, the scout environmental data can be extended and/or updated, for example, on the basis of the following vehicle environmental data collected by the following vehicle 2: if in the process it is detected that one of the scout orientation points 202 no longer exists, for example, because a vehicle parked on the hard shoulder has been moved on, then the dataset stored on the external server 3 can be adapted accordingly. A filter algorithm determines whether the changes are minor and therefore an adjustment can be made, or whether they make the automatic navigability of the scout trajectory 201 doubtful, which necessitates a new acquisition of scout environmental data along the scout trajectory 201 by a manually driven scout vehicle 1.

In a further exemplary embodiment, one of the following vehicle orientation points 203 is not recorded by the following vehicle 2 with sufficient quality, for example, a traffic sign in poor visibility conditions cannot be read automatically with sufficient certainty. Then, following vehicle environmental data, in this example image data of the traffic sign, are transferred to the scout vehicle 1, whose driver acts as a decision agent. He can now make a decision as to whether or not the automatic driving can safely continue and, for example, can transfer control signals indicating the contents of the traffic sign to the following vehicle 2. The decision agent can also be integrated into the system via the external server 3.

LIST OF REFERENCE NUMERALS

1 Scout vehicle
2 Following vehicle
3 External server
10 Data interface (scout vehicle)
11 Acquisition unit, sensors (scout vehicle)
12 Route planner (scout vehicle)
13 Control Unit (scout vehicle)
20 Data interface (following vehicle)
21 Acquisition Unit, sensors (following vehicle)
22 Route planner (following vehicle)
23 Control unit (following vehicle)
24 Autopilot (following vehicle)
101 Generation of scout trajectory
102 Acquisition of actual trajectory
103 Comparison of scout and actual trajectory
104 Evaluation of scout trajectory as non-automatically navigable
105 Acquisition of scout environmental data
106 Transfer of scout environmental data and scout trajectory
107 Generation of target trajectory
108 Comparison of scout and target trajectory
109 Abort
110 Acquisition of following vehicle environmental data
111 Comparison of scout and following vehicle environmental data
112 Evaluation of target trajectory as non-automatically navigable
113 Activation of the automatic control
201 Actual trajectory of scout vehicle
202 Scout orientation points, scout environmental data
203 Following vehicle orientation points, following vehicle environmental data
204 Target trajectory of following vehicle

The invention claimed is:

1. A method for automatic control of at least one following vehicle, the method comprising:
generating a scout trajectory for a scout vehicle;
guiding the scout vehicle along an actual trajectory, wherein the actual trajectory of the scout vehicle and scout environmental data are recorded using sensors of the scout vehicle;
generating a target trajectory for the following vehicle, and recording following vehicle environment data by sensors of the following vehicle;
transferring the actual trajectory, scout trajectory, and scout environmental data to the following vehicle and,
in response to both the recorded actual trajectory and the generated target trajectory having at least a specified degree of trajectory similarity to the scout trajectory generated and the following vehicle environment data having at least a specified environmental data similarity to the scout environmental data, activating an automatic control of the following vehicle along the target trajectory.

2. The method as claimed in claim 1, wherein the scout vehicle is driven manually by a scout driver.

3. The method of claim 1, further comprising:
activating a safe driving mode of the following vehicle in response to the environment data similarity not exceeding a value of the specified environment data similarity.

4. The method of claim 1, wherein the automatic control of the following vehicle comprises a control of the movement of the following vehicle in the longitudinal and transverse directions.

5. The method of claim 1, wherein data relating to the scout trajectory and/or data relating to the target trajectory and/or scout environmental data and/or following vehicle environment data are transferred to an external server and are stored by the server.

6. The method of claim 5, wherein the external server transfers data relating to the scout trajectory and/or scout environmental data to the following vehicle.

7. The method of claim 1, wherein the sensors of the scout vehicle and/or the sensors of the following vehicle record image data.

8. The method of claim 1, wherein the following vehicle environmental data are transferred to a decision agent and control data are transferred from the decision agent to the following vehicle in response to the environmental data similarity not exceeding a value of the specified environmental data similarity.

9. The method of claim 1, wherein the scout environmental data and/or the following vehicle environmental data relate to highway construction sites and/or traffic signs.

10. The method of claim 1, wherein priorities are determined and the environmental data similarity is generated in accordance with the priorities in response to deviations between the scout environmental data and the following vehicle environmental data.

11. The method of claim 1, wherein scout vehicle data on properties of the scout vehicle are transferred to the following vehicle and the automatic control of the following vehicle is activated in accordance with the scout vehicle data.

12. A system for automatic control of at least one following vehicle by a scout vehicle, the scout vehicle comprising:
- a scout route planner by which a scout trajectory is generated for the scout vehicle;
- a scout control device by which the scout vehicle is driven along an actual trajectory;
- sensors by which the actual trajectory and scout environment data are recorded; and
- a scout data interface by which the actual trajectory, scout trajectory, and scout environment data are transferred to the following vehicle;

wherein the following vehicle comprises:
- a following vehicle data interface by which the actual trajectory, scout trajectory, and scout environment data are received from the scout vehicle,
- a following vehicle route planner by which a target trajectory is generated for the following vehicle,
- sensors by which following vehicle environmental data are recorded, and
- a following vehicle control device by which the following vehicle is controlled along the target trajectory;

wherein, based on both the recorded actual trajectory and the generated target trajectory, at least one trajectory similarity to the scout trajectory generated is determined, the scout trajectory and scout environmental data are transferred to the following vehicle, based on the following vehicle environmental data and the scout environmental data an environmental data similarity is determined, and an automatic control of the following vehicle along the target trajectory is activated in accordance with the environmental data similarity.

13. The system of claim 12, wherein the following vehicle environmental data are transferred to the scout vehicle by the following vehicle data interface and control data are transferred from the scout vehicle to the following vehicle by the scout data interface.

14. The system of claim 12, wherein an external server is also comprised, which at least part of the time is connected by a data communication connection over a network to the scout vehicle and/or to the following vehicle for data communication, and by which data relating to the scout trajectory and/or scout environmental data and/or following vehicle environment data are stored.

15. The system of claim 12, wherein the scout trajectory and the target trajectory are generated by the scout route planner and the following vehicle planner, so that they are substantially identical.

* * * * *